United States Patent [19]
Ullmann et al.

[11] 4,029,928
[45] June 14, 1977

[54] ELECTRO-EROSION MACHINE TOOLS

[75] Inventors: Werner Ullmann, Locarno; Ferdy E. Hermann, Luzern, both of Switzerland

[73] Assignee: A.G. fur industrielle Elektronik AGIE Losone b. Locarno, Losone, Switzerland

[22] Filed: Apr. 28, 1975

[21] Appl. No.: 572,087

[30] Foreign Application Priority Data

Sept. 16, 1974 Switzerland ............. 12550/74

[52] U.S. Cl. .................... 219/69 E; 204/280; 219/69 M
[51] Int. Cl.² ............... B23P 1/08; C25C 7/02
[58] Field of Search ............ 219/69 E, 69 R, 69 M, 219/69 V, 69 G; 204/129.1, 129.46, 224 M, 280, 286

[56] References Cited
UNITED STATES PATENTS

| | | | |
|---|---|---|---|
| 2,974,215 | 3/1961 | Inoue | 219/69 M |
| 3,306,838 | 2/1967 | Johnson | 219/69 E |
| 3,433,727 | 3/1969 | Keeleric | 219/69 E |
| 3,536,603 | 12/1967 | Bonga | 219/69 E |

FOREIGN PATENTS OR APPLICATIONS

| | | | |
|---|---|---|---|
| 43,939 | 3/1966 | Germany | 219/69 E |
| 189,275 | 11/1966 | U.S.S.R. | |

Primary Examiner—Bruce A. Reynolds
Attorney, Agent, or Firm—Flynn & Frishauf

[57] ABSTRACT

In order to machine a multidimensionally curved surface on a workpiece using an electro-erosion, i.e. spark erosion or electro-chemical erosion, machine tool, the machine tool is provided with a tool electrode which has an effective machining face inclined to the direction in which the advance feed drive of the machine tool advances the tool electrode towards the workpiece. By using transverse feeding mechanisms for the tool electrode or the workpiece acting under the control of a computer, or by using a cam and guide arrangement coupled to the tool electrode, the tool electrode and workpiece are so relatively moved that the effective machining face of the electrode always moves in the direction of the momentary largest radius curvature of the curve to be machined. When a cam and guide arrangement is used, the tool electrode can be coupled to the advance feed drive by way of a coupling device which incorporates a universal joint, or a domed surface sliding joint. The effective machining face of the tool electrode can be curved in accordance with at least a part of the curve to be machined.

7 Claims, 5 Drawing Figures

ELECTRO-EROSION MACHINE TOOLS

SUMMARY OF THE INVENTION

This invention relates to electro-erosion machine tools and to the machining of multidimensionally curved surfaces with such machine tools.

Throughout this specification, the term electroerosion machine tool is intended to cover machine tools in which material is eroded from a workpiece by the action of an electrical discharge between the workpiece and a tool electrode, the term thus covers spark and pulse erosion machine tools, and also electro-chemical machine tools in which the erosion is by virtue of the electrolytic effect of the electrical discharge.

Tool electrodes for the electro-erosive production of recesses of different complicated geometrical forms in workpieces are known, and examples are described in U.S. Pat. Nos. 2,902,584 and 3,041,442, both assigned to the assignee of this application. These known tool electrodes either produce an image in the workpiece of their own form, or their movement is utilised for the image formation. In some cases, the image formation is produced by a combination of the electrode form and of its movement. Although diverse examples of forms of construction of tool electrodes are known, difficulties nevertheless arise in the production of special surfaces, for example in the case of pump impellers and turbine wheels. Such impellers or wheels can have very complicated geometrical forms usually with multidimensionally curved surfaces. Although such surfaces obey a particular law and can therefore be represented by envelope curves (aerodynamic and hydraulic profiles) and although tangential planes can be constructed at any desired point on these surfaces, it is nevertheless difficult to machine such surfaces with existing machine tools. This difficulty arises both in electro-erosion machine tools as well as in the more conventional chip-removing types such as milling and shaping machines, even when these are controlled by process computers. The difficulty is sometimes met by hand-machining the cast pump or turbine wheels, the surface being hand-worked by eye, section by section, between fixed lines of intersection of the surface of the wheels, by means of a manually controlledtool. Such a manual working method is not longer economically feasible, because the cost thereof is too high further, it is difficult to achieve high precision and the occupational hygiene is low. Owing to this hand-working, it is impossible to use for the pump and turbine wheels materials which would be of great advantage in the operation thereof, for example materials presenting particularly high resistance to erosion and cavitation due to pollution of the medium flowing through the pump or turbine, and to corrosion.

The invention thus far has for its object to provide an electro-erosion machine tool with which it is more easily possible to machine the surfaces of articles such as cast turbine wheels or pump impellers having complicated geometrical forms including multidimensionally curved surfaces.

According to the invention, there is provided an electro-erosion machine tool for machining a multidimensionally curved surface on a workpiece, the machine tool comprising:

a. support means for supporting said workpiece;
b. a tool electrode comprising an effective machining face for being presented to the said workpiece; and
c. tool advancing means which has an output member coupled to said tool electrode and which is operable to move said output member in a direction towards said workpiece whereby the tool electrode is advanced towards said workpiece;
said tool electrode being so coupled to said output member that said effective machining face is inclined to said direction of movement of said output member, and said machine tool further comprising:
d. curve direction movement means for causing said workpiece and said tool electrode to be relatively moved, while said advancing means is moving said output member in said directon, along such a path that said effective machining face moves in relation to the workpiece in the direction of the momentary largest radius curvature of the curved surface to be machined on said workpiece.

Said tool advancing means may be operable also for moving said output member, and hence also said tool electrode, transverse to the said direction of movement, the said curve direction movement means then comprising process computer means coupled to the tool advancing means for causing the advancing means to move the tool electrode along said path.

As a modification of the above, said workpiece support means can comprise a translating mechanism whereby said workpiece may be moved transverse to the said directon of movement, said curve direction movement means then comprising process computer means coupled to said translating mechanism and to said advancing means for causing the translating mechanism to move the workpiece and for causing the advancing means to move the tool electrode so that the workpiece and tool electrode relatively move along said path.

In other embodiments to be described, the curve direction movement means comprises a part which is fixed in relation to the said tool electrode and which defines a guide face, and template means which is fixed in relation to said workpiece and which is in engagement with said guide face so as to guide the tool electrode to move in relation to said workpiece along said path. In such embodiments, it is preferred that said tool electrode is coupled to said output member as aforesaid by means of a coupling device which enables the tool electrode to move in relation to the output member and the workpiece under the influence of said template means.

Said coupling device can comprise a body part which is fixed to said output member and which comprises portions defining a concave, annular bearing surface having an axis inclined to said direction of movement, and a member to which is fixed said tool electrode and which comprises portions defining a convex bearing surface, this convex bearing surface being slidably engaged with said concave bearing surface and the member being coupled to said body part by spring coupling means which biasses the member towards a median position of its allowed, sliding movement with respect to said body part, in which median position the said effective machining face is inclined at a predetermined angle to said direction of movement.

Advantageously, said coupling device comprises a body part which is movably coupled to said output member and to which is movably coupled said tool electrode, the said coupling device including spring biassing means acting on said tool electrode and the coupling device being such that the tool electrode is biassed towards a median position of its allowed movement with respect to the said body part, in which median position of the tool electrode and the said effective machining face is inclined at a predetermined angle with respect to said direction of movement of said output member, and the said curve direction movement further comprising a guide surface and cooperating link assembly which is coupled between said body part and said workpiece support means and which is operable for guiding said body part so that, in response to movement of said output member in said direction, the body part moves along a spirally curving path.

In another embodiment, said coupling device comprises a body part which is coupled to said outputmember, and a universal joint assembly which is displaceably coupled to said body part and to which is attached said tool electrode, said coupling device including spring biassing means acting on said universal joint assembly, and said coupling device being such that the universal joint assembly and the tool electrode are biassed towards a median position of their movement with respect to said body part, in which median position the said effective machining face is inclined at a predetermined angle with respect to said direction of movement of said output member.

Preferably, pressure means is connected between said coupling device and said tool electrode, the pressure means being operable for so pushing the tool electrode that said guide face is urged into said engagement with said template means.

The said effective machining face is advantageously curved in correspondence with at least a part of said curved surface to be machined on said workpiece.

BRIEF DESCRIPTION OF THE DRAWINGS

For a better understanding of the invention, and to show how the same may be carried into effect, reference will now be made, by way of example, to the accompanying drawings, in which.

Figure 1:
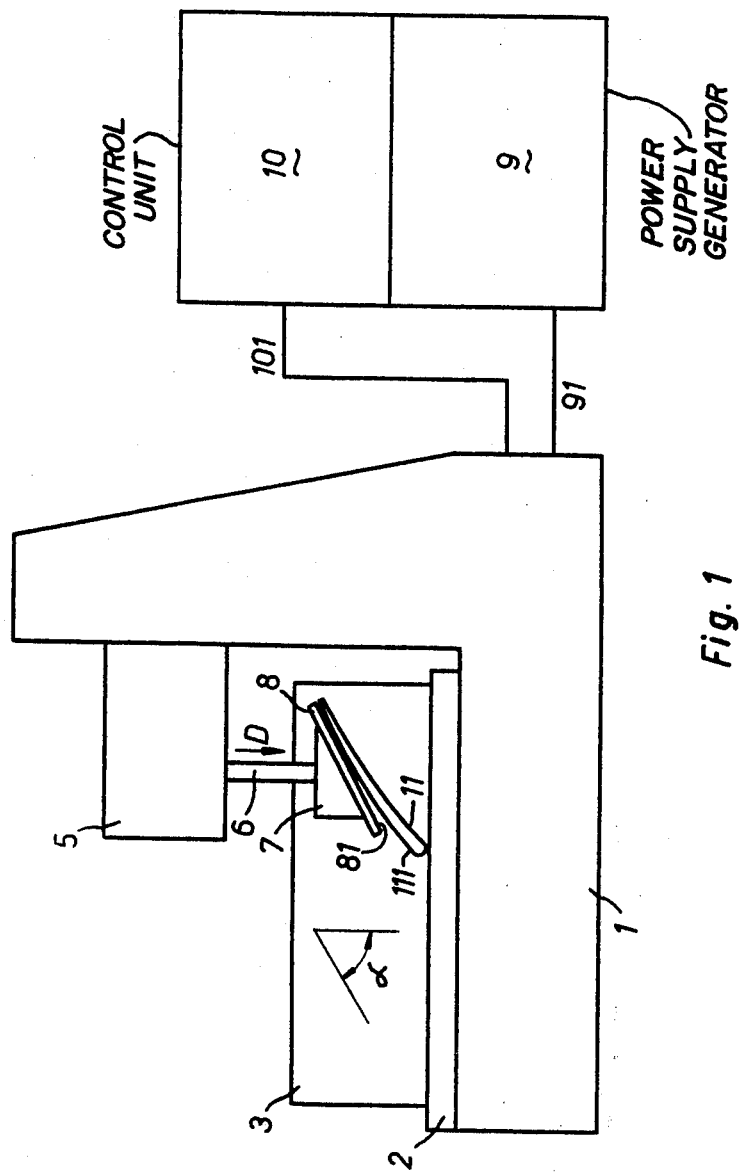
FIG. 1 is a diagrammatic, side view of an electroerosion machine tool in accordance with the invention.

The electro-erosion machine tool 1 shown in FIG. 1 may be a spark or pulse erosion machine or an electro-chemical machine. It comprises a workpiece table 2 on which is supported a container 3 in which the workpiece 11 to be machined is disposed, and which contains a liquid. In a spark or pulse erosion machine the liquid will be dielectric and is for flushing the eroded material away from the area being machined. In an electro-chemical machine, the liquid will comprise a suitable electrolyte used both for flushing and for enabling the electro-chemical action to take place. A forward feed device 5 is so mounted on the working machine that its position is vertically adjustable. The forward feed device 5 comprises an output spindle 6, to which there is secured a coupling device 7 which is so designed that a tool electrode 8 attached to the device 7 takes up a position in which its active working face 81 is inclined at a particular angle α in relation to the vertical direction D of forward advance imparted to the spindle 6 by the feed device 5. The said angle α, which, in the present case, has a value of about 45°, is drawn to the left of the device 7 in FIG. 1 for reasons of space. The working face 81 of the tool electrode 8 is presented to the multidimensionally curved surface 111 to be machined of the workpiece 11 which here comprises a cast, four-bladed Francis turbine wheel (only the one blade 11 being shown). Situated to the right of the working machine 1 are a generator 9 and a control unit 10. The generator 9 supplies power with the necessary electrical parameters, for example, particular values of voltage and current in the case of electrochemical working, or current, pulse frequency, pulse duty factor and operating voltage in the case of spark and pulse erosion machining, through the line 91 to the tool electrode an hence to the work gap between the active working face 81 of the tool electrode 8 and the surface 111 of the workpiece 11. The electric or electronic control unit 10 applies drive signals through the line 101 to motors (not shown) forming the drive for a translating mechanism incorporated in the workpiece table 2 and/or to motor(s) forming the drive for the feed advance device 5. These motors may be electrical servo-motors, for example stepping motors. Normally, the control unit 10 will consist of a process computer which controls the progress of the work on the basis of punched-card data and takes account of the operating conditions in the workgap, so that the whole process of electro-erosive or electrochemical machining is optimised. The control unit 10 controls the operation of the machine tool so that, as the machining of the surface 111 of the workpiece 11 progresses, the machining face 81 of the electrode 8 travels in the direction of the largest radius curvature of the face 111. For this, the electrode 8 may be movably coupled to the output spindle 6 of the feed device 5 and the output spindle 6 only moved in the direction D. Embodiments in which this occurs will be described later with reference to FIGS. 2, 3, 4 and 5. Alternatively, the electrode 8 may be rigidly secured with respect to the spindle 6, the device 7 then comprising simply a rigid member having the shape shown in FIG. 1 for example and made, for example, of hard plastics material or metal. In order for the working face 81 of the tool electrode 8 to travel in the direction of the largest radius of curvature of the surface 111, the feeding movement of the tool electrode 8 has to have a sideways component in relation to the workpiece 11. In the case where the tool electrode 8 is rigidly fixed with reference to the spindle 6, such a sideways component may be imparted by means of an additional translating and drive mechanism incorporated in the feed advance 5 whereby, in addition to the normal feed advance component D, there can be given to the spindle 6 and hence also to the electrode 8 a further movement component at right angles to the direction D. Alternatively, the workpiece table 2 can incorporate a feed mechanism whereby the workpiece 11 can be moved at right angles to the direction D thus giving the same effect as moving the spindle 6 at right angle to the direction D. In either case, the control unit 10 so controls the relative movement of the workpiece 11 and tool electrode, i.e. by controlling the operation of the direction D advancing motor and the drive motor of the translating mechanism incorporated either in the device 5 or in the workpiece table 2, that the working face 81 of the electrode always travels relative to the workpiece 11 in the direction of the momentary largest radius curvature of the surface 111. This applies even when the surface 111 is of very comlex geometry.

As mentioned earlier, FIGS. 2 to 5 relate to embodiments in which the tool electrode 8 is movably coupled to the spindle 6, the device 7 being adapted to provide such movability. FIGS. 2 to 5 show only that part of the machine tool 1 in FIG. 1 which includes the device 7 and the tool electrode.

Figure 2:
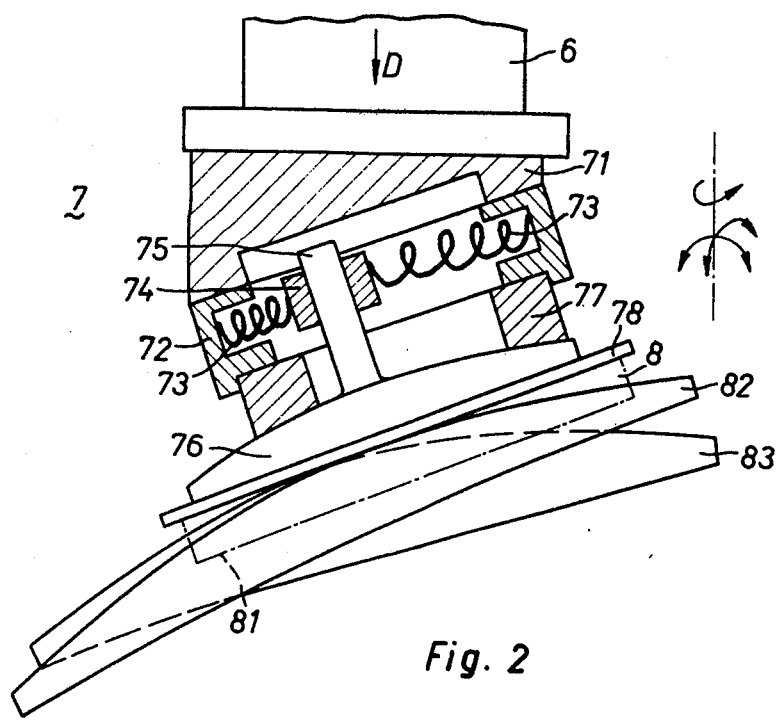
FIGS. 2, 3, 4 and 5 are side views of respective embodiments of a combination of a tool electrode and a curve direction movement means for use in a machine tool according to the invention, FIGS. 2 and 5 being partly sectioned.

In FIG. 2, the coupling device 7 consists of a body member 71 one side of which is fixed to the lower end of the spindle 6 and the opposite, i.e. the lower, side of which is inclined by the angle $\alpha$ with respect to the direction of movement D of the spindle 6. Fixed to the inclined side of the member 71 is a hollow member 72 containing a spring biassing mechanism. This mechanism comprises a collar 74 and spiral springs 73 each acting between the collar and the inner peripheral surface of the hollow member 72 in such a manner that the collar is biassed to take up a position central to the hollow space within the member 72. A ring-shaped member 77 is attached to the lower side of the member 72. This member 77 defines, at its lower face, an annular concave bearing surface. A dome-shaped member 76 defining at its upper surface a convex bearing surface is positioned so that its bearing surface is in sliding engagement wih the concave bearing surface of the member 77. The dome-shaped member 76 comprises a pin extension 75 which extends up through the member 77 and into the member 72 where it is rotatably engaged in the collar 74. The spring biassing mechanism thus acts on the dome-shaped member 76 tending to bias it towards a median positon in which the pin extension is coaxial with the ring-shaped member 77. Attached to the flat bottom of the dome-shaped member 76 is a flat plate defining a flat guide surface 78 and fixed beneath this flat plate is the tool electrode 8. Thus, in the median position of the dome-shaped member 76, the working face 81 of the tool electrode 8 is inclined at the angle $\alpha$ with respect to the direction D. The member 76 and the tool electrode take up this median position when no external influence is applied thereto but, under the action of such an influence, the member 76 can slide with respect to the member 72, such sliding being accompanied by a change of the angle of inclination of the working face 81 with respect to the direction D and a movement of the working face 81 in the direction transverse to the direction D. The aforementioned influence is applied by means of guide templates 82 and 83 which are fixed to the workpiece or otherwise fixedly arranged with respect to the workpiece (not shown in FIG. 2) and whose guide edges engage the guide surface 78. The templates 82 and 83 are made and positioned by plotting so-called "standard sections" from the desired form to which the surface of the workpiece is to be machined.

The width of the tool electrode 8 is, of course, such that the active machining face 81, which is chain dotted in FIG. 2, can produce the desired final geometry of the face 111 of the workpiece 11. The tool electrode 8 is moved in the direction D by the feed advance device 5 during the machining operation. The particular mounting of the tool electrode 8 in the member 72 makes it possible for the face 81 of the tool electrode 8 to travel along the surface 111 of the workpiece 11 in response to this normal feed advance movement in the directon D and under the guiding influence of the templates 82 and 83. In this movement, the tool electrode 8 is so positioned, as a result of the rotatable mounting of the pin 75, that its face 81 always travels in the direction of the largest radius curvature of the face 111 of the workpiece 11. The rotational mounting with pin 75 at the same time renders possible a rotation about a verticl axis (axis in the directon of D) while the electrode is moving with the dome member 76 in the direction of the largest curvature under the effect of the feed advance movement D, so that channels having a double curvature can be machined. A control unit 10 according to FIG. 1 is thus unnecessary for the control of the tool electrode with the device illustrated in FIG. 2. The control unit 10 may, of course, be employed for other control purposes during the working process.

Figure 3:
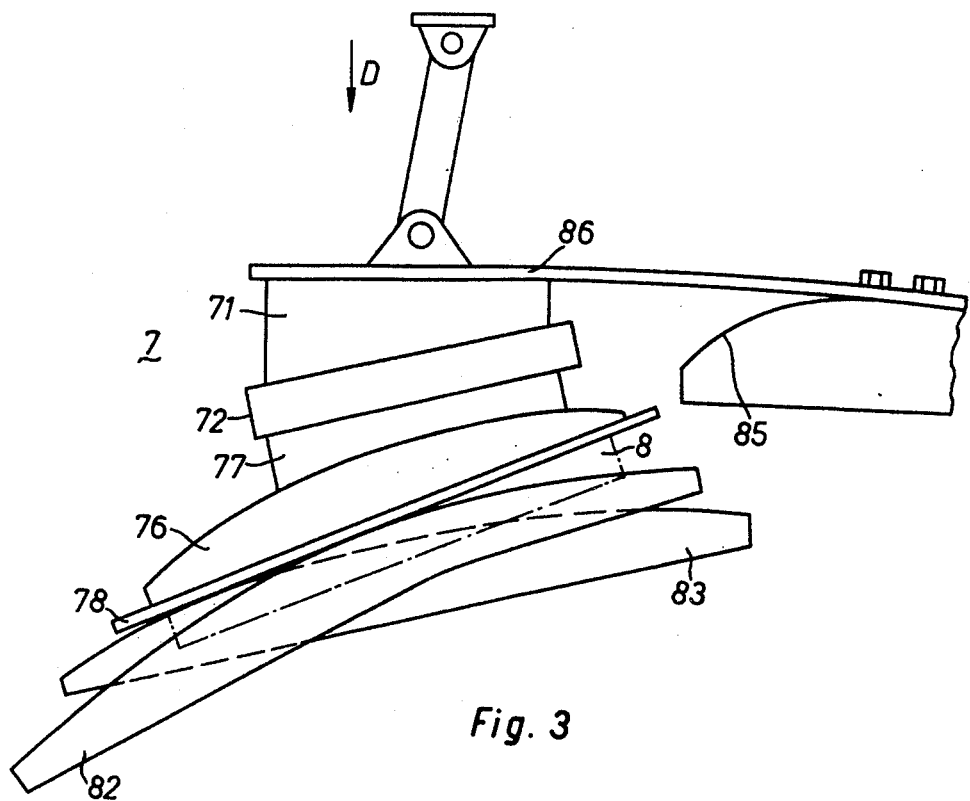

There is illustrated in FIG. 3 an embodiment in which the coupling device 7 is the same as that of FIG. 2, but in which the feed advance of this device is in a constantly changing direction. The spindle 6 (not shown in FIG. 3) is coupled to the device 7 by a hinge linkage so that, although the spindle still advances in the direction D, the direction of movement of the device 7 can change as aforesaid. This change in direction is obtained by means of a curved guide member 85 which is fixed to a retaining device disposed in the container 3 (FIG. 1). Fixed, at one end, to the member 85 and at its other end to the device 7 is like a spring linkage member 86 which, as the spindle 6 moves downwards, is bent around the curved surface of the guide member 85. Thus, on movement of the spindle 6 in the direction D, the centre of the body member 71 of the device 7 describes a spiral path of constantly changing radius which is determined by the shape of the member 85 and by the spring member 86. By means of the embodiment as illustrated in FIG. 3, the machining of more comlex profiles on turbine wheels and pump impellers is rendered possible.

Figure 4:
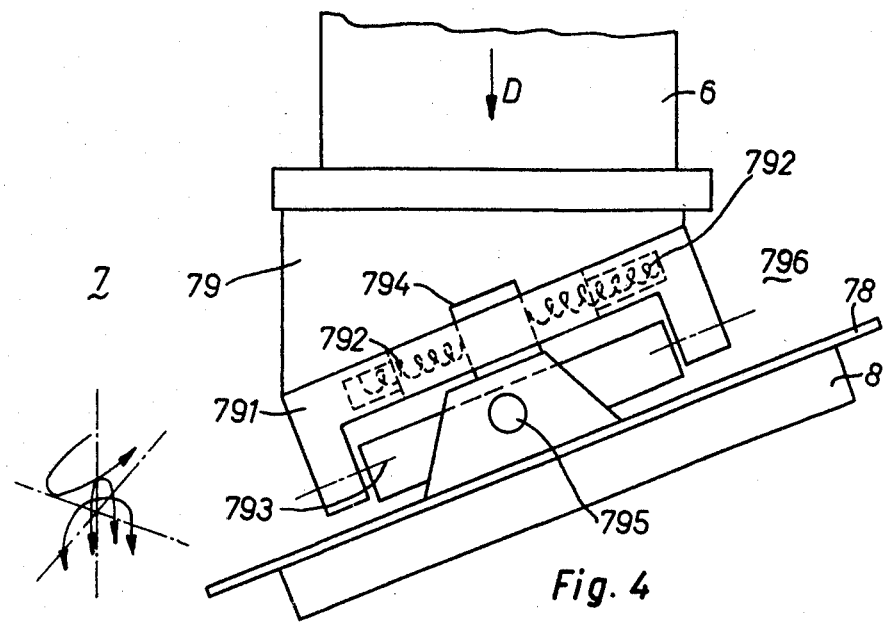

In the FIG. 4 embodiment, the device 7 consists of a body member 79, to which there is fixed a bearing pin or bolt 794. By means of the pin or bolt 794, a member 791 is rotatably and movably coupled to the member 79. The member 791 forms part of a universal joint 796, and is formed with a recess in which a spring biassing mechanism 792, similar to the corresponding spring system in FIG. 2, is so disposed that the joint 796 is held by the pre-loaded springs in the central position illustrated in FIG. 4. When the tool electrode 8 is pushed in any direction by means of templates (not shown), the part 791 also moves in that directon. The universal joint or knuckle joint 796 consists of the pins 793 and 795 having perpendicular axes with respect to either of which axes the tool electrode is able to pivot. The whole joint 796, and hence also the tool electrode 8, can rotate about the axis of the pin or bolt 794. Between the joint 796 and the electrode 8 is the guide face defining member 78 which is influenced by the templates 82 and 83 during the machining operation. This influence is exerted in the same way as has been described with reference to FIG. 2. Therefore, the said templates are not shown in FIG. 4.

The templates could be omitted if the spring biassing system 792 were to be replaced by a driven feed spindle system which constantly varies the position and/or angle of the electrode 8, with the aid of a process computer, in accordance with the depth position.

Figure 5:
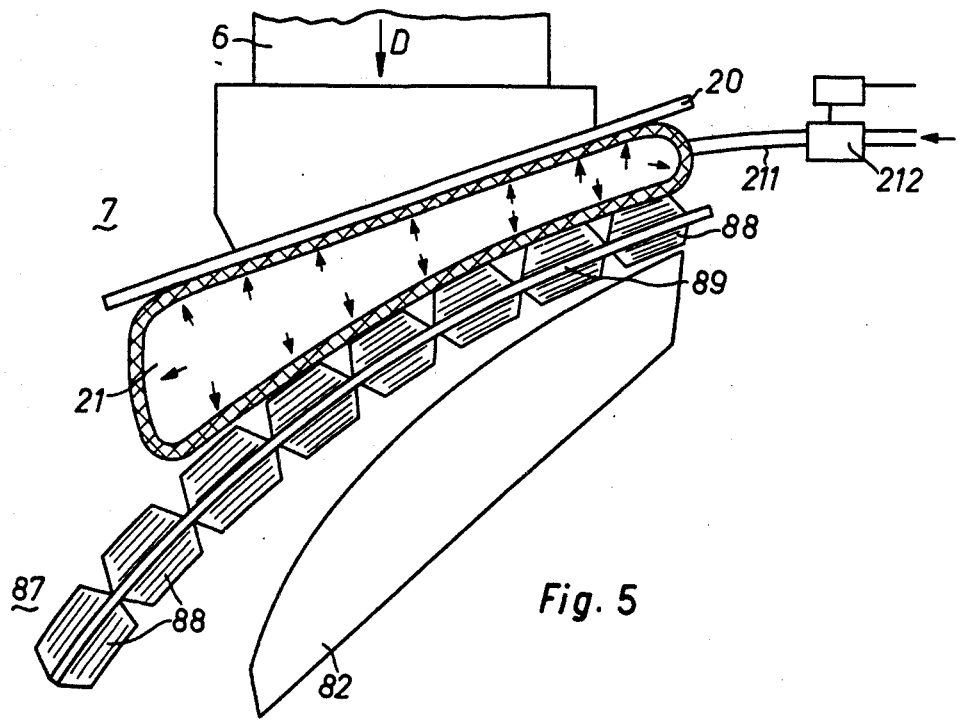

In the FIG. 5 embodiment, the coupling device 7 is mounted on the spindle 6, which is moved indirection D by means of the feed advance device 5 (not shown in FIG. 5). The said device 7 may be constructed in the form illustrated in FIG. 2, 3 or 4 except that the plate-shaped member 78, referenced 20 in FIG. 5, is not used to define a guide surface, i.e. it does not cooperate with the templates, and the tool electrode is not attached directly to it. Instead, interposed between the plate 20 and the tool electrode (referenced 87 in FIG. 5) is a rubber bladder 21 which is filled and pressurised by means of a control device 212 which supplies a filling and pressurizing medium through a supply duct 211. In FIG. 4, the pressurization is indicated by arrows pointing in the direction of the wall of the bladder. The bladder 21 presses on the one hand against the plate 20 and on the other hand against the tool electrode 87. This tool electrode is in form of a "segmental" electrode and consists of individual truncated segments 88 which are secured to a spring element 89. Situated below the segmental electrode 87 is the face 111 of the workpiece 11 (not shown). Also situated below the electrode 87 are the templates 82 and 83 of which only the template 82 is shown, the template 83 having been omitted from the illustration for the sake of clarity. The rubber bladder 21 presses the individual segments 88 of the segmental electrode 87 against the template 82. The spring element 89 is electrically non-conductive, while the electrode segments 88 are electrically conductive. The individual segments 88 are pressed, in accordance with the contour of the template 82, against the surface 111 of the workpiece 11 which is to be machined. The electro-erosive or electrochemical working operation then takes place. The rubber bladder 21 ensures that the segmental electrode 87 machines the surface 111 in exactly the manner prescribed by the templates 82 and 83. During the working operation, the pressure in the rubber bladder 21 can be so varied by means of the control unit 212 that the working proceeds in optimum manner.

We claim:

1. An electro-erosion machine tool for machining a multidimensionally curved surface (111) on a workpiece (11), the machine tool comprising
   support means (2) for supporting said workpiece;
   a tool electrode (3) having an electro-erosion machining face (31) presented to said workpiece (11);
   and feed means (5, 6, 7) coupled to said tool electrode (8) to move the machining face (81) thereof relative to the workpiece to advance the tool electrode towards said workpiece;
   wherein, in accordance with the invention,
   the tool electrode (8) has its machining face (81) inclined at an angle of inclination (c) with respect to the direction of movement (D) of the feed means (5, 6, 7);
   the machining face (81) of the tool (8), for a convex surface to be machined, has a larger radius of curvature than the curvature of the curved surface (11) to be machined on said workpiece;
   and curve direction movement means (10, 78, 82, 83, 85, 86) are provided to cause, upon feed of the tool electrode at said angle of inclination to simultaneously effect electro-erosive machining, shifting of the tool electrode with respect to the workpiece, and a rolling movement of the machining face (81),
   said curve direction movement means comprising a part (78) which is fixed in relation to the said tool electrode (8) and which defines a guide face, and template means (82, 83) which is fixed in relation to said workpiece and which is in engagement with said guide face so as to guide the tool electrode to move in relation to said workpiece along said path.

2. A machine tool according to claim 1, wherein the tool feed means includes an output member (6) and a coupling device (7) is provided coupling the tool electrode (8) to said output member (6) to move the tool electrode in relation to the output member (6) and the workpiece as guided by the template means (82, 83).

3. A machine tool according to claim 2, wherein said coupling device (7) comprises a body part (71, 72, 77) which is fixed to said output member (6) and which comprises portions defining a concave, annular bearing surface having an axis inclined to said direction of movement (D), and a member (75) to which is fixed said tool electrode (8) and which comprises portions defining a convex bearing surface, this convex bearing surface being slidably engaged with said concave bearing surface and the member (75) being coupled to said body part (71, 72, 77) by spring coupling means (73, 76) which biasses the member (75) towards a median position of its allowed, sliding movement with respect to said body part, in which median position the said effective machining face (81) is inclined at a predetermined angle ($\alpha$) to said direction of movement (D) (FIG. 2).

4. A machine tool according to claim 2, wherein said coupling device (7) comprises a body part (71, 72, 77) which is movably coupled to said output member (6) and to which is movably coupled said tool electrode (8), the said coupling device (7) including spring biassing means acting on said tool electrode and the coupling device (7) being such that the tool electrode (8) is biassed towards a median position of its allowed movement with respect to the said body part (71, 72, 77), in which median position of the tool electrode the said effective machining face (81) is inclined at a predetermined angle ($\alpha$) with respect to said direction of movement (D) of said output member (6), and the said curve direction movement means further comprising a guide surface and co-operating link assembly (85, 86) which is coupled between said body part (71, 72, 77) and said workpiece support means (2) and which is operable for guiding said body part (71, 72, 77) so that, in response to movement of said output member in said direction (D), the body part moves along a spirally curving path (FIG. 3).

5. A machine tool according to claim 2, wherein said coupling device (7) comprises a body part (71, 72, 77) which is coupled to said output member (6), and a universal joint assembly (793, 794, 795) which is displaceably coupled to said body part and to which is attached said tool electrode, said coupling device (7) including spring biassing means (792) acting on said universal joint assembly, and said coupling device (7) being such that the universal joint assembly and the tool electrode are biassed towards a median position of their movement with respect to said body part (71, 72, 77), in which median position the said effective machining face (81) is inclined at a predetermined angle ($\alpha$) with respect to said direction of movement (D) of said output member (6) (FIG. 4).

6. A machine tool according to claim 2, including pressure means (21) connected between said coupling device (7) and said tool electrode (8), the pressure means (21) being operable for so pushing the tool electrode that said guide face is urged into said engagement with said template means (FIG. 5).

7. A machine tool according to claim 1, wherein said machining face (81) is curved in correspondence with at least a part of said curved surface to be machined on said workpiece.

* * * * *